(No Model.)
G. B. DEAN.
MACHINE FOR CUTTING CORN.
No. 309,773. Patented Dec. 23, 1884.
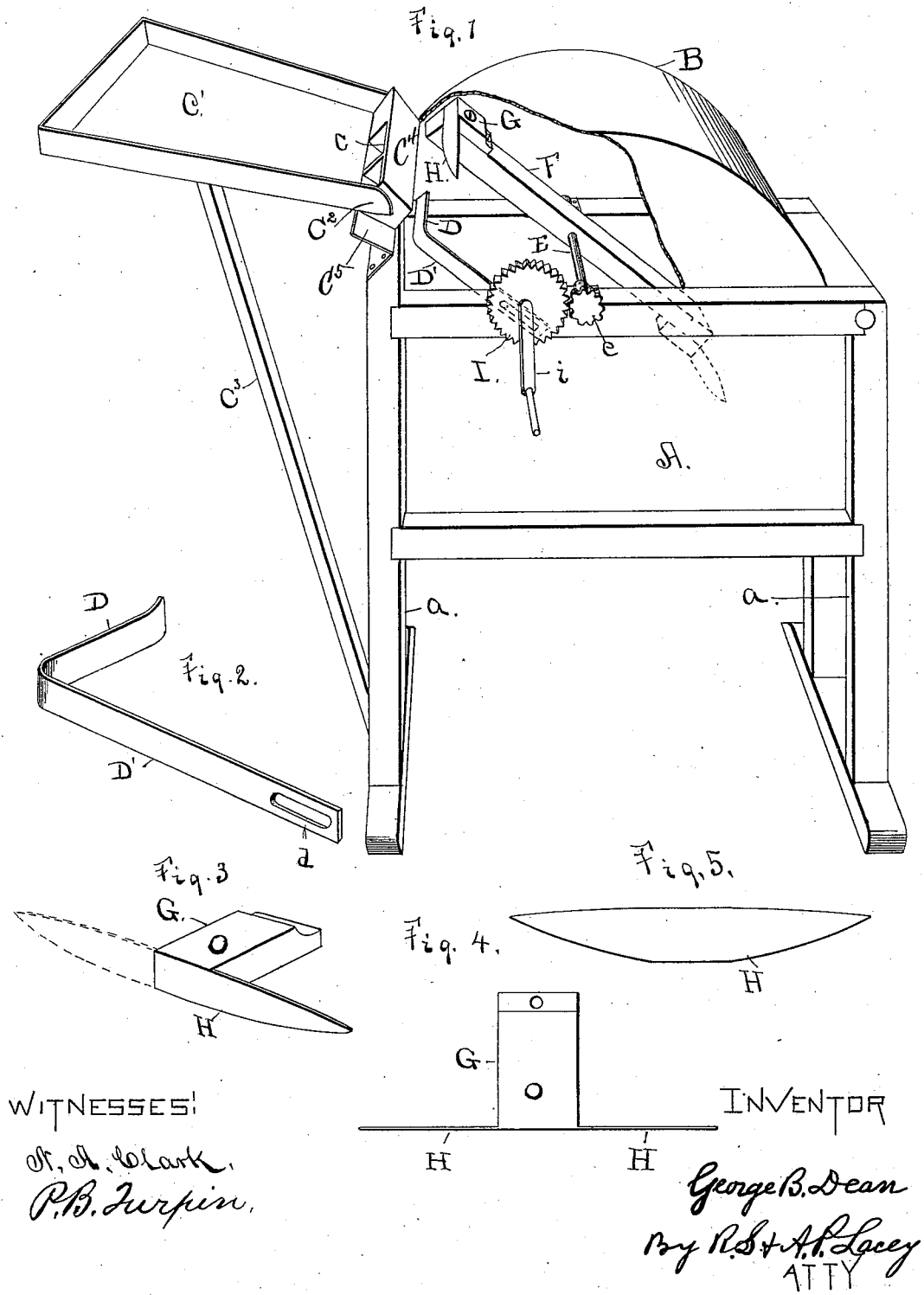
WITNESSES:
N. A. Clark
P. B. Turpin
INVENTOR
George B. Dean
By R. S. & A. P. Lacey
ATTY

UNITED STATES PATENT OFFICE.

GEORGE B. DEAN, OF LAMOILLE, ILLINOIS, ASSIGNOR OF ONE-HALF TO JEREMIAH Y. BURNETT, OF SAME PLACE.

MACHINE FOR CUTTING CORN.

SPECIFICATION forming part of Letters Patent No. 309,773, dated December 23, 1884.

Application filed April 9, 1884. (No model.)

*To all whom it may concern:*

Be it known that I, GEORGE B. DEAN, a citizen of the United States, residing at Lamoille, in the county of Bureau and State of Illinois, have invented certain new and useful Improvements in Machines for Cutting Corn; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to machines for cutting corn in the ear; and it consists in the novel construction, combination, and arrangement of the several parts, as will be hereinafter more fully described and claimed.

In the drawings, Figure 1 is a perspective view of my machine, the hood or cover being broken away to show the operating parts. Fig. 2 is a detail view of the stop. Fig. 3 is a detail view of the weight and knife. Fig. 4 shows the weight provided with a different form of knife, and Fig. 5 is a detail front view of the knife shown in Fig. 4.

In carrying my invention into effect I employ a suitable supporting-frame, consisting, preferably, of the box or casing A, mounted on legs $a$, and provided with a hood or cover, B, which incloses the cutting devices. The framing is provided at one end with feed-passages C, inclined downward toward their inner ends, and preferably formed through a casting, $C^4$, fixed to the framing, and provided with lateral wings $C^5$, projected from its lower side. A stop, D, is arranged within the framing, and preferably secured thereto by means of the shank D', bent at right angles from one end of said stop, and provided near its end with a slot, $d$, through which the retaining-screw is passed. This stop, it will be seen, is arranged in front and parallel to the feed-openings. By means of slotted shank D' the stop may be adjusted to and from said openings to vary the size of the cuttings, as will obviously appear. A shaft, E, is journaled on the framing parallel to the feed-openings and stop D. The cutter-bar F is secured at its middle to said shaft, and has its end extended in position to move alongside the stop D when shaft E is revolved. Weights G are secured on this bar at its opposite ends, and on the rear side of same with reference to the line of its motion. Knives H are secured, preferably, on the ends of these weights, and extend laterally, so as to move close to the inner end of the feed-passages, as will be understood from Fig. 1. When so desired, these knives may be secured directly to the bar.

In Figs 4 and 5 I have shown the knife extended on both sides of the weight. Where so desired, this construction could be used. This, it will be seen, would involve the necessity of a separate stop on each side of the cutter-bar.

The shaft E may be provided with a pulley or crank and driven by steam, horse, or other power. When fed by self-feeder, the self-feeder will be elevators driven by pulley on shaft E; but when intended for use by hand I preferably provide it with a pinion, $e$, meshed with a drive-gear, I, having a suitable crank-handle, $i$. By this construction the shaft may be rapidly and easily driven, and by arranging the drive-gear on the side near the feed-passages the operator is brought near thereto, so he may readily feed with one hand and drive the shaft with the other.

The feed-table is preferably removably secured by ears $C^2$, which extend on opposite sides of the casting $C^4$, resting on the wings $C^5$, and is supported by a standard, $C^3$, as shown. Where so desired, this feed-table may be dispensed with; but for convenience I prefer to use it, as shown. I intend this especially for use when the machine is driven by the operator with one hand on the driving-crank, and his other feeding the machine, in which case the table holds the ears of corn in convenient manner for properly feeding the same. The weights are removably secured to the cutter-bars by bolts or screws, so that they may be removed when desired. These weights, it will be seen, serve the end of fly-wheels, greatly increasing the centrifugal force of the cutting-bar and rendering the machine easier of operation and more efficient, as will be readily seen.

The operation of the machine is simple, and will be fully understood from the description before given. The ears of corn inserted one through each of the feed-passages rest against the stop. When a piece is cut off, the shortened ear drops again against said stop, and so on till the ear is entirely cut up.

It is obvious that the bar F might be provided at one end only with the cutters, or might be made with a single one only; but I prefer the construction shown and before described.

Having described my invention, what I claim, and desire to secure by Letters Patent, is—

1. In a corn-cutter, the combination of the frame, the casting $C^4$, provided with feed-passages C and lateral wings $C^5$, the cutter-bar provided with knives operating close to the inner end of the feed-passages, and the removable feed-table having ears $C^2$ fitted detachably on opposite sides of the casting $C^4$, and a standard or upright, $C^3$, substantially as set forth.

2. The combination, in a corn-cutting machine, of the framing provided with feed-passages C, the shaft E, arranged at right angles to the said feed-passages, the bar secured on the said shaft, and having knives projected at right angles from its outer ends and arranged to cut close to the inner ends of the feed-passages, and counterpoising-weights secured on the outer end of the said bar, substantially as set forth.

3. In a corn-cutting machine, the combination of the framing, the casting $C^4$, mounted on one end thereof, and provided with passages C and lateral wings $C^5$, the shaft E, journaled in the framing at right angles to feed-passages C, the bar F, secured on the shaft E, and provided on its ends with right-angled knives arranged to cut close to the inner ends of the feed-passages, the stop D, provided with right-angled arm D', secured adjustably to the framing, the table C', having ears $C^2$ fitted removably on opposite sides of the casting $C^4$ and resting on the wings $C^5$, and the standard or upright $C^3$, substantially as set forth.

In testimony whereof I affix my signature in presence of two witnesses.

GEORGE B. DEAN.

Witnesses:
GEO. W. ULTCH,
W. G. PORTER.